(12) United States Patent
Shavell et al.

(10) Patent No.: US 9,876,872 B1
(45) Date of Patent: Jan. 23, 2018

(54) METHOD OR MECHANISM FOR SELF NOTIFICATION AVOIDANCE

(71) Applicant: Symantec Corporation, Mountain View, CA (US)

(72) Inventors: Michael Shavell, Merrimack, NH (US); John Brockway, Westford, MA (US)

(73) Assignee: SYMANTEC CORPORATION, Mountain View, CA (US)

( * ) Notice: Subject to any disclaimer, the term of this patent is extended or adjusted under 35 U.S.C. 154(b) by 322 days.

(21) Appl. No.: 14/678,778

(22) Filed: Apr. 3, 2015

(51) Int. Cl.
H04L 29/08 (2006.01)
H04L 29/06 (2006.01)
H04L 12/58 (2006.01)

(52) U.S. Cl.
CPC ............ *H04L 67/26* (2013.01); *H04L 51/24* (2013.01); *H04L 67/303* (2013.01); *H04L 67/42* (2013.01)

(58) Field of Classification Search
CPC ...................................................... H04L 51/24
See application file for complete search history.

(56) References Cited

U.S. PATENT DOCUMENTS

| | | | |
|---|---|---|---|
| 7,228,447 B1 * | 6/2007 | Day | G06F 1/28 713/300 |
| 8,112,475 B2 * | 2/2012 | Tran | G06F 9/4843 455/418 |
| 8,244,822 B1 * | 8/2012 | Lowry | H04L 67/26 709/202 |
| 8,655,307 B1 * | 2/2014 | Walker | H04W 52/0212 455/343.5 |
| 8,667,072 B1 * | 3/2014 | Cordell | H04L 67/26 709/206 |
| 9,203,960 B1 * | 12/2015 | Koum | H04W 4/14 |
| 9,413,708 B1 * | 8/2016 | Michael | H04L 51/24 |
| 9,596,276 B1 * | 3/2017 | Michael | H04L 51/24 |
| 2007/0057767 A1 * | 3/2007 | Sun | G06F 1/3228 340/7.35 |
| 2008/0195739 A1 * | 8/2008 | Ozzie | H04L 29/06 709/228 |
| 2008/0219138 A1 * | 9/2008 | Gotoh | G11B 20/10 369/275.2 |
| 2008/0228772 A1 * | 9/2008 | Plamondon | G06F 17/30902 |
| 2009/0183157 A1 * | 7/2009 | Tran | G06F 1/3203 718/100 |
| 2009/0327491 A1 * | 12/2009 | Tran | G06F 15/173 709/225 |
| 2012/0198268 A1 * | 8/2012 | Qureshi | G06F 11/1443 714/4.1 |

(Continued)

*Primary Examiner* — Lashonda Jacobs
(74) *Attorney, Agent, or Firm* — Maschoff Brennan

(57) ABSTRACT

A method for self-notification avoidance in a push notification system is provided. The method includes receiving, at a server configured to provide a push notification service, a notification from one of a plurality of endpoint devices to be pushed to the plurality of endpoint devices, wherein the plurality of endpoint devices has a shared identifier, and wherein the one of the plurality of endpoint devices has a globally unique identifier (GUID). The method includes identifying, at the server, the globally unique identifier in the notification and pushing the notification from the server to each of the plurality of endpoint devices having the shared identifier except the one of the plurality of endpoint devices that has the globally unique identifier.

20 Claims, 4 Drawing Sheets

(56) References Cited

U.S. PATENT DOCUMENTS

| | | | |
|---|---|---|---|
| 2013/0198516 A1* | 8/2013 | Fenton | H04L 63/0869 713/168 |
| 2013/0307844 A1* | 11/2013 | Moon | G06T 15/00 345/419 |
| 2013/0325922 A1* | 12/2013 | Chaudhri | G06Q 10/10 709/203 |
| 2014/0025738 A1* | 1/2014 | Anand | H04L 67/10 709/204 |
| 2014/0068588 A1* | 3/2014 | Tan | G06F 8/67 717/169 |
| 2014/0189015 A1* | 7/2014 | Chan | G06Q 10/107 709/204 |
| 2014/0304363 A1* | 10/2014 | Mhatre | H04L 67/26 709/217 |
| 2014/0342714 A1* | 11/2014 | Sanders | H04W 4/021 455/418 |
| 2016/0241657 A1* | 8/2016 | Amrhein | H04L 67/2814 |
| 2016/0323357 A1* | 11/2016 | Lang | G06F 17/30864 |
| 2017/0046944 A1* | 2/2017 | Namazi | G08B 27/00 |

\* cited by examiner

METHOD OR MECHANISM FOR SELF NOTIFICATION AVOIDANCE

BACKGROUND

Notification protocols strive to push notification messages to devices accurately and with minimal latency. In some cases an identifier (ID) is shared by multiple endpoint devices, so that a push notification service can push notifications to all of the endpoint devices with the shared ID. A notification may include update information or a request to synchronize, so that the endpoint device receiving such a notification synchronizes to the endpoint device that sent the notification. When an endpoint device with a shared ID sends frequent updates, which are pushed to all endpoint devices with the shared ID, the original sending device receives the frequent updates unnecessarily. It is in the above context that the embodiments arises.

SUMMARY

In some embodiments, a method for self-notification avoidance in a push notification system is provided. The method includes receiving, at a server configured to provide a push notification service, a notification from one of a plurality of endpoint devices to be pushed to the plurality of endpoint devices, wherein the plurality of endpoint devices has a shared identifier, and wherein the one of the plurality of endpoint devices has a globally unique identifier (GUID). The method includes identifying, at the server, the globally unique identifier in the notification and pushing the notification from the server to each of the plurality of endpoint devices having the shared identifier except the one of the plurality of endpoint devices that has the globally unique identifier.

In some embodiments, a tangible, non-transitory, computer-readable media having instructions thereupon which, when executed by a processor, cause the processor to perform a method. The method includes receiving a notification from an endpoint device having a globally unique identifier (GUID) and a shared identifier and determining the globally unique identifier from the notification. The method includes pushing the notification to each of a plurality of endpoint devices having the shared identifier but not to the endpoint device having the shared identifier and the globally unique identifier.

In some embodiments, a push notification system is provided. The system includes a server, configured to couple to a network and configured to receive notifications, via the network, from at least one of a plurality of endpoint devices having a shared identifier, the notifications to be pushed to the plurality of endpoint devices having the shared identifier. The server is configured to recognize a globally unique identifier in a notification, indicating the notification originates from one of the plurality of endpoint devices associated with both the shared identifier and the globally unique identifier and to push the notification to each of the plurality of endpoint devices associated with the shared identifier excluding the one of the plurality of endpoint devices associated with the globally unique identifier.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

A push notification system with a mechanism for self notification avoidance is described below. The push notification system receives a notification from an endpoint device with a shared ID (identifier) and a globally unique identifier (GUID), extracts the globally unique identifier from the notification, and pushes the notification to all of the endpoint devices that have the same shared ID except the endpoint device that has the globally unique identifier. This mechanism prevents the endpoint device that originates the notification from experiencing self notification, and reduces incidences of wake up, synchronization, radio connection time, and battery power consumed by these incidences, for that endpoint device.

Figure 1:
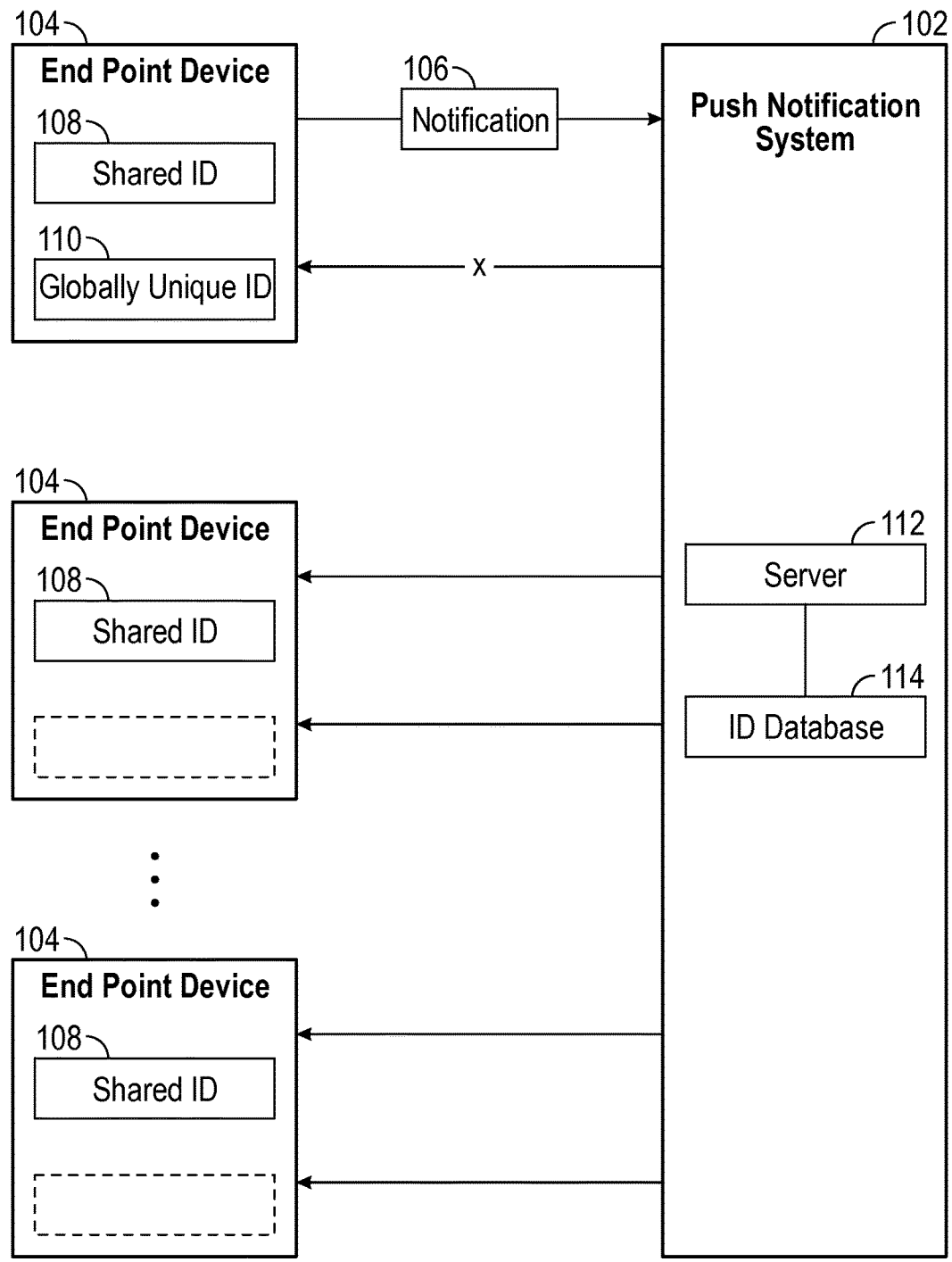
FIG. 1 is a system diagram depicting an endpoint device with a shared ID (identifier) and a globally unique ID, sending a notification to a push notification system, which pushes the notification to endpoint devices having the same shared ID but not the globally unique ID.

FIG. 1 is a system diagram depicting an endpoint device 104 with a shared ID 108 and a globally unique ID 110, sending a notification 106 to a push notification system 102, which pushes the notification 106 to endpoint devices 104 having the same shared ID 108 but not the globally unique ID 110. In the embodiment shown, the push notification system 102 has a server 112 and an ID database 114, which could be in the server 112 or coupled to the server 112. The ID database 114 has shared IDs 108 and globally unique IDs 110 which various users and endpoint devices 104 have registered to the push notification system 102. For example, a company, a department, a family or an individual could register multiple endpoint devices 104 with a shared ID 108 (e.g., a shared ID 108 that indicates Company X's devices, the XYZ family's devices, or Bob's devices). Each group of shared endpoint devices has a shared ID 108 that differs from the shared ID 108 of each other group of shared endpoint devices. Conceivably, a device could belong to two or more shared groups and correspondingly have two or more shared IDs 108. One endpoint device 104, some endpoint devices 104, or all endpoint devices 104 in a group of shared endpoint devices could each have a globally unique ID 110 that differs from all other globally unique IDs 110. That is, in a group, the shared ID 108 is the same across members of the group, while each member of the group may have a globally unique ID that is, as the name implies, unique to each member. This feature is depicted in FIG. 1 as one endpoint device 104 having the shared ID 108 and a globally unique ID 110, while all of the other endpoint devices 104 in the group have the same shared ID 108 but none of the other endpoint devices 104 have the same globally unique ID 110. The dashed lines in some of the endpoint devices 104 symbolize that the endpoint device 104 may or may not have a globally unique ID 110.

Still referring to FIG. 1, to use the push notification system 102, the endpoint device 104 that has the shared ID 108 and the globally unique ID 110 sends a notification 106 directly or indirectly to the push notification system 102. The server 112 in the push notification system 102 receives the notification 106, and checks the notification 106 against the ID database 114. Based on contents of the notification 106 (which will be discussed with reference to FIG. 3) and the ID database 114, the server 112 determines to send the notification 106 to the endpoint devices 104 that have the shared ID 108 but not the globally unique ID 110. Equivalently, the server 112 determines to not send the notification 106 to the endpoint device 104 that has the shared ID 108 and the globally unique ID 110 but to send the notification 106 to all other endpoint devices 104 that have the shared ID 108. This activity is depicted in FIG. 1 as arrows from the server 112 showing where the notification 106 is pushed. The arrow with the "X" on it is symbolic of the server 112 not pushing the notification 106 back to the originating endpoint device 104.

Figure 2:
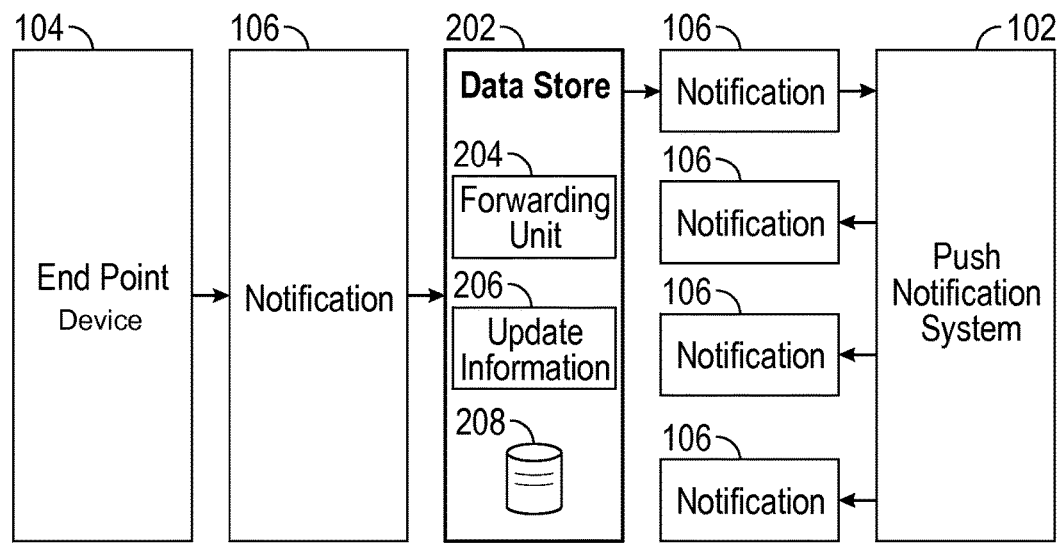
FIG. 2 is a system diagram depicting the endpoint device sending a notification with update information to a data store, which stores the update information and forwards the notification to the push notification system.

FIG. 2 is a system diagram depicting the endpoint device 104 sending a notification 106 with update information 206 to a data store 202, which stores the update information 206 and forwards the notification 106 to the push notification system 102. This is a variation of the activity shown in FIG. 1. For example, the notification 106 could include update information 206 such as change of address, change of a system parameter, global positioning system (GPS) coordinates, a new logon ID, etc. The data store 202 could be providing a service such as identity protection, common repository of user information, user tracking, commercial transactions, etc. The data store 202 receives the notification 106, e.g., with a server, extracts the update information 206 from the notification 106, and stores the update information 206, e.g., in a storage 208 included in or coupled to the data store 202.

In this example, the data store 202 has a forwarding unit 204, which forwards the notification 106 to the push notification system 102. In turn, the push notification system 102 pushes the notification 106 to other endpoint devices 104, as described above with reference to FIG. 1. In various scenarios, the endpoint devices 104 that receive the notification 106 apply the update information 206 to synchronize with the originating endpoint device 104, interpreting the notification 106 as a request to synchronize. This may involve writing the update information 206 into an endpoint device 104, or connecting to the originating endpoint device 106 for synchronization.

Figure 3:
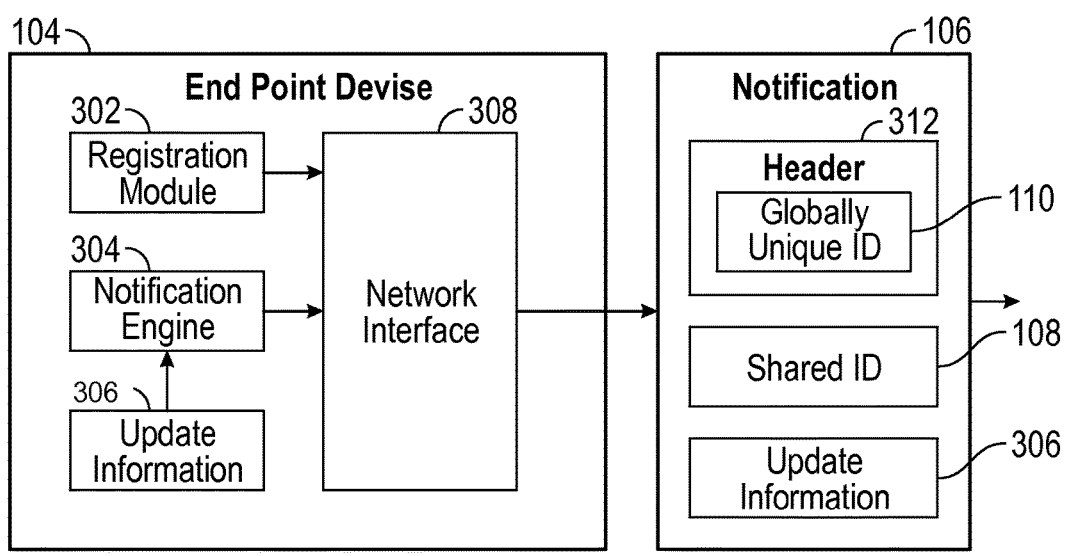
FIG. 3 is a block diagram showing internal contents of an embodiment of an endpoint device and a notification.

FIG. 3 is a block diagram showing internal contents of an embodiment of an endpoint device 104 and a notification 106. The endpoint device 104 has a network interface 308, which the endpoint device 104 uses to communicate via a network, e.g., to the data store 202 and/or to the push notification system 102. To use the self notification avoidance feature of the push notification system 102, the endpoint device 104 employs a registration module 302 via the network interface 308, and registers the globally unique ID 110 with the push notification system 102. For example, the endpoint device 104 could communicate with the push notification system 102 and register both the shared ID 108 and the globally unique ID 110 in association with the endpoint device 104. Alternatively, a user could communicate with the push notification system 102 via another device, and register the shared ID 108 and the globally unique ID 110 with the push notification system 102. In some embodiments, the registration module 302 automates the registration process, and may generate a globally unique ID 110 and/or a shared ID 108. In some embodiments, a media access control (MAC) ID of the network interface 308 is used as the globally unique ID 110.

The endpoint device 104 has a notification engine 304, which generates notifications 304 that include the update information 306. For example, when the user updates personal information, the notification engine 304 could automatically send this information out via the network interface 308 to the push notification system 102. If the endpoint device 104 has a GPS device, the endpoint device 104 could send a sequence of GPS coordinates as the update information 306 via the notification engine 304. An example notification 106 includes a header 312, and the update information 306. In some embodiments, the globally unique ID 110 is in the header 312. In some embodiments, the globally unique identifier is a uniform resource name (URN), a uniform resource locator (URL), or a uniform resource identifier (URI). The shared ID 108 could be in the body of the notification 106, as shown, or could be in the header 312 or elsewhere in the notification 106.

Figure 4:
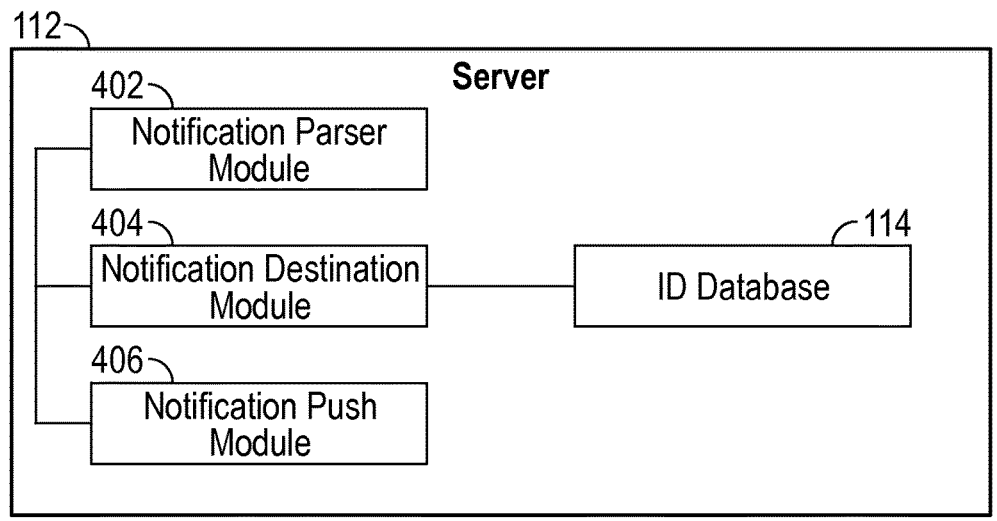
FIG. 4 is a block diagram showing internal contents of an embodiment of a server for the push notification system of FIG. 1.

FIG. 4 is a block diagram showing internal contents of an embodiment of a server 112 for the push notification system 102 of FIG. 1. Various modules 402, 404, 406 can be implemented in software executing on a processor, firmware, hardware or combinations thereof. The server 112 has a notification parser module 402, which receives a notification 106 and parses the notification 106. In some embodiments, the notification parser module 402 determines whether the notification 106 has a globally unique ID 110 or a shared ID 108, and extracts each of these where applicable.

A notification destination module 404, coupled to the ID database 114, determines one or more destinations for the notification 106 to be pushed to. For example, the notification destination module 404 could check with the ID database 114 to see if a shared ID 108, if found by the notification parser module 402, is registered with the push notification system 102. The notification destination module 404 could check with the ID database 114 to see if a globally unique ID 110, if found by the notification parser module 402, is registered with the push notification system 102. In some embodiments, the notification 106 would not need to include a shared ID 108, and the notification destination module 404 could determine whether a globally unique ID 110 found by the notification parser module 402 is associated with a shared ID 108 in the ID database 114. Once the notification destination module 404 determines one or more destinations for pushing the notification 106, the notification destination module 404 communicates this to the notification push module 406. The notification push module 406 pushes the notification 106 out to the one or more destinations, e.g., to endpoint devices 104 that have a shared ID 108 of the originating endpoint device 104 but do not have the globally unique ID 110 of the originating endpoint device 104.

With reference to FIGS. 1-4, an example flow is herein described. The endpoint device 104 registers with a new globally unique ID 110. The endpoint device 104 initiates a Long Poll (which emulates a push mechanism) with a data store 202, in order to send a sequence of notifications 106 with update information 306. The endpoint device 104 sends notifications 106, each of which has a header 312 with the globally unique ID 110, and update information 306. The data store 202 notifies the push notification system 102, by sending/forwarding the notifications 106, each with the header 312 that has the globally unique ID 110. The push notification system 102 sends/pushes the notifications 106 to endpoint devices 104 that have the shared ID 108, but does not send/push the notifications 106 to the originating endpoint device 104, because the globally unique ID 110 in the headers 312 of the notifications 106 matches the globally unique ID 110 of the originating endpoint device 104.

The above example flow is suitable for the Norton Identity Safe™, which uses the Oxygen Data Store™ and the Single Point of Contact (SPOC)™, which are products of the assignee. In this example, the customer modifies a login using Norton Identity Safe™. The customer endpoint device 104 originates a notification 106 that has a header such as "X-Symc-SPOC-Identity:", which signifies an extension header (e.g., "X"), a proprietary product from a specified supplier (e.g., "Symc" for Symantec™, and SPOC™ as above), and a keyword that indicates a globally unique ID 110 is included (e.g., "Identity:", which would be followed by the globally unique ID 110). The Norton Identity Safe™ data is stored within the Oxygen Data Store™ to allow a customer to synchronize identity data across multiple devices or services. When a customer changes identity information on the device, for example by adding a new website login and password, the login information from the device is written to the Oxygen Data Store™. While processing the new login, the Oxygen Data Store™ sends a SPOC™ notification for all devices and/or Web portals that require the new login information. The device the customer used to modify the login is itself registered for SPOC™ notifications when the customer's identity information changes. But, without the above push notification system 102, the device that is used to modify the identity information would itself be notified needlessly, as the updated login information is already present on the local system. Embodiments of the push notification system 102 remove the self-notification entirely, resulting in saved server and client resources. Embodiments of the push notification system 102 may be suitable for various products or services such as SPOC™, Oxygen Data Store™, EPMP (endpoint management protocol), NMS (Apache .NET Messaging API (application programming interface)), Norton Online Family™, and/or APNS™ (Apple Push Notification Service). It should be appreciated that the description of the above products is not meant to limit the scope of the embodiments as the embodiments may be integrated with other products and the examples provided above are for explanatory purposes and not meant to be limiting.

Figure 5:
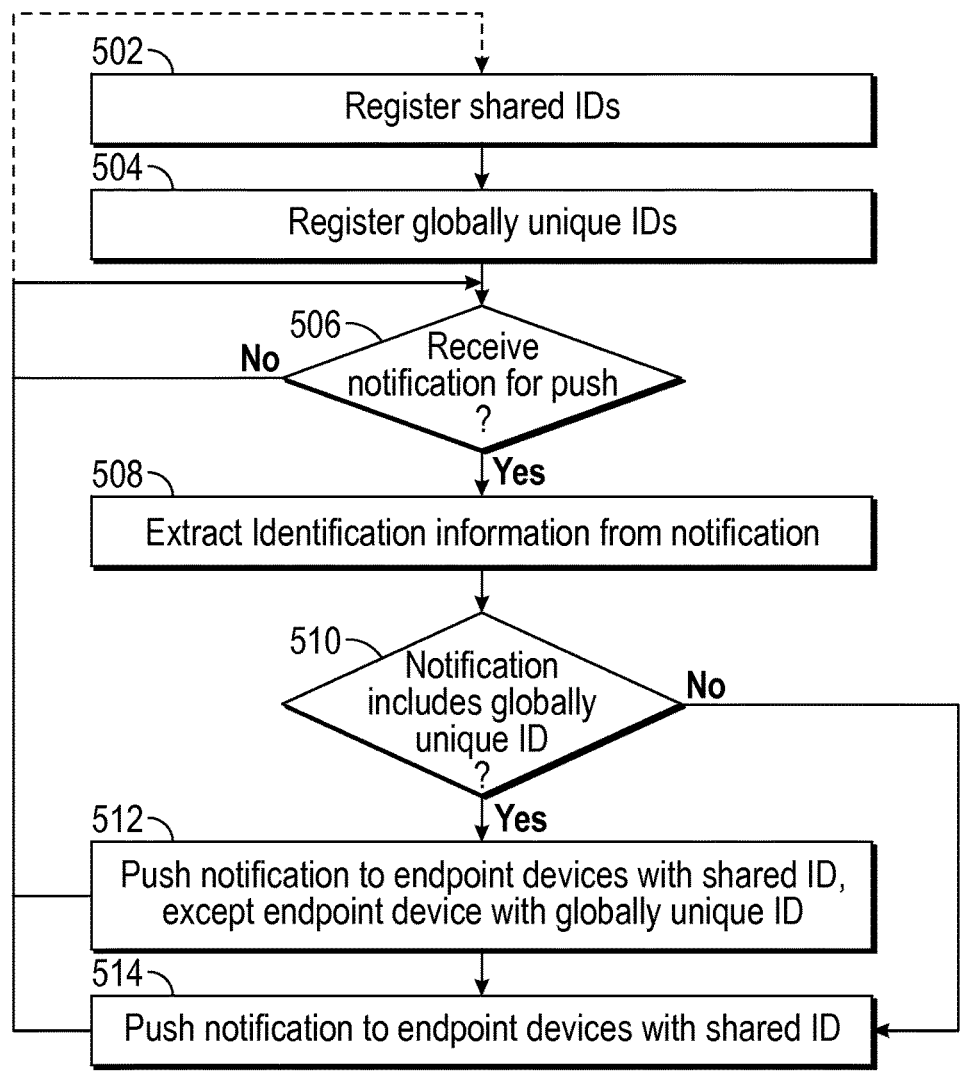
FIG. 5 is a flow diagram of a method of operating a push notification system, which can be performed on or by embodiments of the push notification system of FIGS. 1-4.

FIG. 5 is a flow diagram of a method of operating a push notification system, which can be performed on or by embodiments of the push notification system of FIGS. 1-4. The method can be practiced by a processor, such as one or more processors of a server in a push notification system. In an action 502, shared IDs are registered. In an action 504, globally unique IDs are registered. For example, the various IDs can be registered by the push notification system in an ID database. A globally unique ID could be associated with a shared ID. Multiple devices could be associated with a shared ID, with each device being associated with a globally unique ID.

In a decision action 506, it is determined whether a notification is received for a push. If there is no notification, flow loops back to the action 506, to continue waiting for a notification. Alternatively, flow could branch back to the action 502 or the action 504, to register another shared ID or unique ID. If there is a notification received, flow proceeds from the decision action 506 to the action 508. In the action 508, identification information is extracted from the notification. For example, a globally unique ID could be extracted from the header of the notification. A shared ID could be determined from a globally unique ID, as associated in the ID database, or determined from the notification itself, for example in the header or the body of the notification. In a decision action 510, it is determined whether the notification includes a globally unique ID. If there is no globally unique ID in the notification, flow proceeds to the action 514. If there is a globally unique ID in the notification, flow proceeds to the action 512.

In the action 512, since there is a globally unique ID in the notification, the notification is pushed to endpoint devices with the same shared ID, except the endpoint device with the globally unique ID. Flow then proceeds back to the decision action 506, to await another notification, or optionally back to the action 502 or the action 504, to register another ID. In the action 514, since there is no globally unique ID in the notification, the notification is pushed to endpoint devices with the shared ID. Flow then proceeds back to the decision action 506, to await another notification, or optionally back to the action 502 or the action 504, to register another ID.

Figure 6:
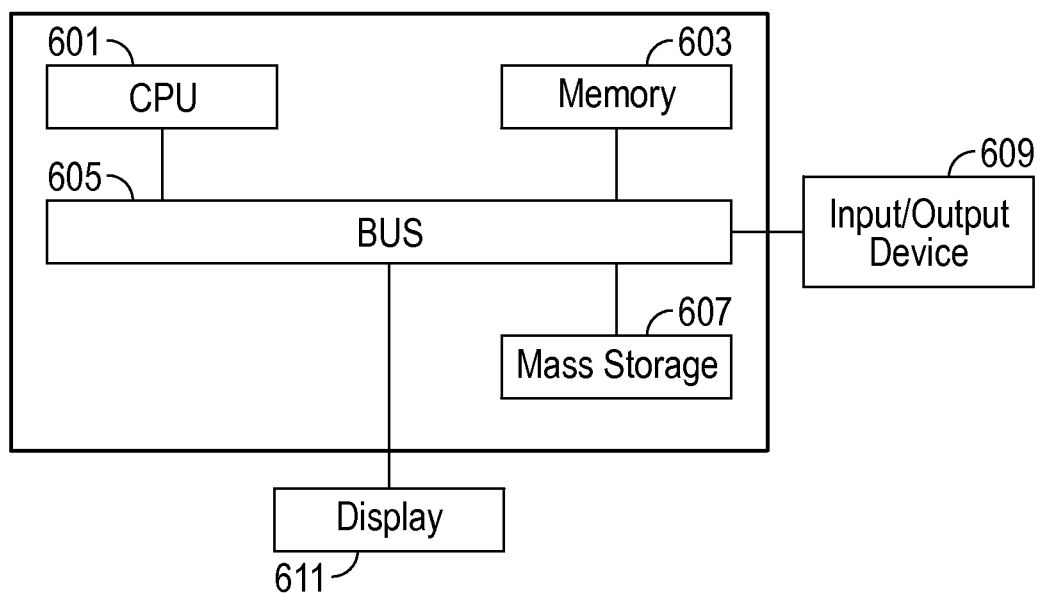
FIG. 6 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 6 is an illustration showing an exemplary computing device which may implement the embodiments described herein. The computing device of FIG. 6 may be used to perform embodiments of the functionality for a push notification system in accordance with some embodiments. The computing device includes a central processing unit (CPU) 601, which is coupled through a bus 605 to a memory 603, and mass storage device 607. Mass storage device 607 represents a persistent data storage device such as a floppy disc drive or a fixed disc drive, which may be local or remote in some embodiments. The mass storage device 607 could implement a backup storage, in some embodiments. Memory 603 may include read only memory, random access memory, etc. Applications resident on the computing device may be stored on or accessed via a computer readable medium such as memory 603 or mass storage device 607 in some embodiments. Applications may also be in the form of modulated electronic signals modulated accessed via a network modem or other network interface of the computing device. It should be appreciated that CPU 601 may be embodied in a general-purpose processor, a special purpose processor, or a specially programmed logic device in some embodiments.

Display 611 is in communication with CPU 601, memory 603, and mass storage device 607, through bus 605. Display 611 is configured to display any visualization tools or reports associated with the system described herein. Input/output device 609 is coupled to bus 605 in order to communicate information in command selections to CPU 601. It should be appreciated that data to and from external devices may be communicated through the input/output device 609. CPU 601 can be defined to execute the functionality described herein to enable the functionality described with reference to FIGS. 1-5. The code embodying this functionality may be stored within memory 603 or mass storage device 607 for execution by a processor such as CPU 601 in some embodiments. The operating system on the computing device may be iOS™, MS-WINDOWS™, OS/2™, UNIX™, LINUX™, or other known operating systems. It should be appreciated that the embodiments described herein may be integrated with virtualized computing system also.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method for self-notification avoidance in a push notification system, comprising:
   receiving, at a server, a notification from one of a plurality of endpoint devices to be pushed to the plurality of endpoint devices, wherein the plurality of endpoint devices has a shared identifier, and wherein the one of the plurality of endpoint devices has a globally unique identifier (GUID);
   identifying, at the server, the GUID in the notification; and
   pushing the notification from the server to each of the plurality of endpoint devices having the shared identifier except the one of the plurality of endpoint devices that has the GUID.

2. The method of claim 1, wherein the identifying includes determining the GUID from a header of the notification.

3. The method of claim 1, wherein the notification includes a request for a synchronization of an endpoint device to which the notification is pushed.

4. The method of claim 1, wherein the GUID is a media access controller identifier (MAC ID).

5. The method of claim 1, wherein practicing the method acts to reduce battery power consumption of the one of the plurality of endpoint devices that has the GUID.

6. The method of claim 1, further comprising:
   receiving, at the server, from the one of the plurality of endpoint devices that has the GUID, a request for registration of the GUID;
   adding the GUID to an identification (ID) database coupled to the server; and
   determining, according to the ID database, which of the plurality of endpoint devices having the shared identifier to push the notification to.

7. The method of claim 1, further comprising:
   sending the notification, including update information and the GUID, from the one of the plurality of endpoint devices having the GUID to a data store;
   storing the update information at the data store; and
   forwarding the notification, including the update information and the GUID, from the data store to the server.

8. A tangible, non-transitory, computer-readable media having instructions thereupon which, when executed by a server processor, cause the server processor to perform a method comprising:
   receiving a notification from an endpoint device having a globally unique identifier (GUID) and a shared identifier;
   determining the GUID from the notification; and
   pushing the notification to each of a plurality of endpoint devices having the shared identifier but not to the endpoint device having the shared identifier and the GUID.

9. The tangible, non-transitory, computer-readable media of claim 8, wherein determining the GUID from the notification includes parsing a header of the notification, and wherein the GUID is in the header.

10. The tangible, non-transitory, computer-readable media of claim 8, wherein the notification includes a request for a synchronization of an endpoint device receiving the notification.

11. The tangible, non-transitory, computer-readable media of claim 8, wherein the processor practicing the method acts to reduce, in the endpoint device having the GUID, at least one of: wake-up power consumption, radio connection power consumption, or synchronization power consumption.

12. The tangible, non-transitory, computer-readable media of claim 8, wherein the method further comprises:
   registering the GUID in association with the endpoint device having the shared identifier and the GUID, in an identification (ID) database, responsive to receiving a request to register the GUID; and
   determining, for each of the plurality of endpoint devices having the shared identifier, whether to push the notification, based on the GUID.

13. The tangible, non-transitory, computer-readable media of claim 8, wherein receiving the notification from the endpoint device includes receiving the notification as forwarded by a data store.

14. A push notification system, comprising:
   a server, configured to couple to a network and configured to receive notifications, via the network, from at least one of a plurality of endpoint devices having a shared identifier, the notifications to be pushed to the plurality of endpoint devices having the shared identifier; and
   the server further configured to recognize a globally unique identifier (GUID) in a notification, indicating the notification originates from one of the plurality of endpoint devices associated with both the shared identifier and the GUID and to push the notification to each of the plurality of endpoint devices associated with the shared identifier excluding the one of the plurality of endpoint devices associated with the GUID.

15. The push notification system of claim 14, further comprising:
   an identification (ID) database, in or coupled to the server; and
   the server configured to write the GUID into the ID database in association with the one of the plurality of endpoint devices, responsive to a request to register the GUID.

16. The push notification system of claim 14, further comprising:
   a parser module in or coupled to the server, the parser module configured to extract the GUID from a header of the notification.

17. The push notification system of claim 14, further comprising:
   a notification destination module, in or coupled to the server, the notification destination module configured to determine one or more destinations for each notification received at the server based on whether the notification has one of one or more GUIDs registered with the server.

18. The push notification system of claim 14, wherein:
the GUID is one of: a uniform resource name (URN), a uniform resource locator (URL), or a uniform resource identifier (URI).

19. The push notification system of claim 14, wherein:
the notification includes a request to synchronize; and
each of the plurality of endpoint devices associated with the shared identifier, except the one of the plurality of endpoint devices associated with the GUID, receives the notification and synchronizes to the one of the plurality of endpoint devices associated with the GUID.

20. The push notification system of claim 14, wherein the notification is received from the one of the plurality of endpoint devices as forwarded by a data store.

\* \* \* \* \*